Figure 1A:
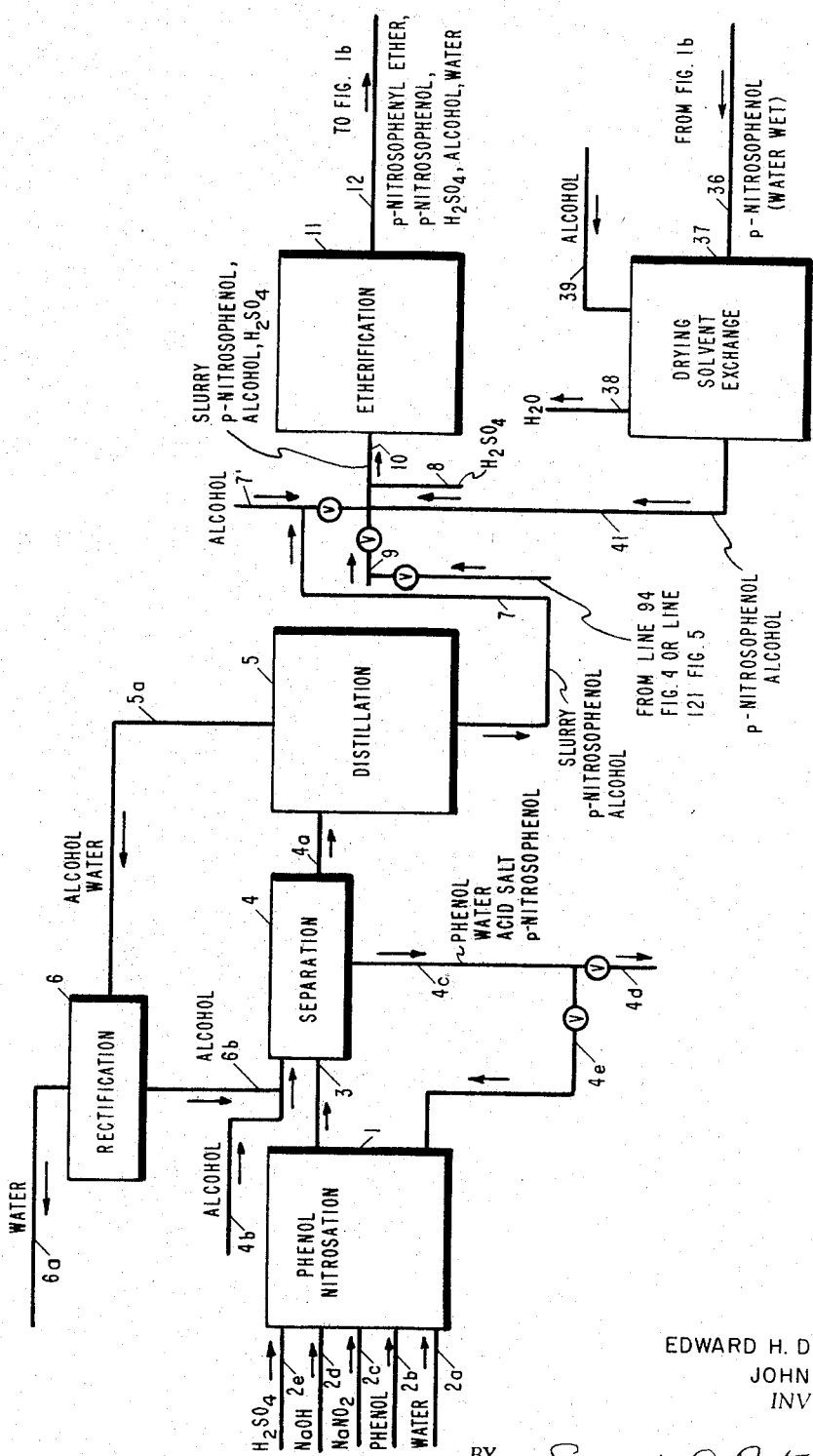

March 21, 1967     E. H. DE BUTTS ETAL     3,310,583
MANUFACTURE OF AMINO PHENYL ETHERS
Original Filed March 28, 1960     5 Sheets-Sheet 2

EDWARD H. DeBUTTS
JOHN T. HAYS
INVENTORS

BY *Ernest G. Peterson*
AGENT

EDWARD H. DeBUTTS
JOHN T. HAYS
INVENTORS

March 21, 1967 E. H. DE BUTTS ETAL 3,310,583
MANUFACTURE OF AMINO PHENYL ETHERS
Original Filed March 28, 1960 5 Sheets-Sheet 4

EDWARD H. DeBUTTS
JOHN T. HAYS
INVENTORS

BY Ernest G. Peterson
AGENT

United States Patent Office 3,310,583
Patented Mar. 21, 1967

3,310,583
MANUFACTURE OF AMINO PHENYL ETHERS
Edward H. de Butts, Cumberland, Md., and John T. Hays, Llangollen Estates, Del., assignors to Hercules Incorporated, a corporation of Delaware
Original application Mar. 28, 1960, Ser. No. 17,896, now Patent No. 3,214,473, dated Oct. 26, 1965. Divided and this application Jan. 15, 1965, Ser. No. 425,882
13 Claims. (Cl. 260—575)

This application is a divisional of our copending application Ser. No. 17,896 filed Mar. 28, 1960, now U.S. Patent 3,214,473.

This invention relates to the reduction of p-nitrosophenyl ethers as a new route to p-aminophenyl ethers, either by direct hydrogenation of the ether or by condensation of the ether to the corresponding azoxy compound followed by reduction of the azoxy compound to form the p-aminophenyl ether. In still another aspect this invention relates to a new route based on phenol as a starting material in the manufacture of p-aminophenyl ethers.

p-Aminophenyl ethers, as is well known, have various utilities as chemical intermediates. Thus, p-phenetidine (p-ethoxyaniline) is especially advantageously employed in the manufacture of analgesics and antipyretics including phenacetin (acetophenetidin), phenocoll (aminoacetophenetidin), and phenacaine; and in various dyes, among which are Alizarine yellow 5G and Fast Acid Blue R. Similarly, p-anisidine (p-methoxyaniline) is used in the production of dyes such as Naphthol ASSG and Rapid Fast Pink LB. A more recently developed, and possibly more commercially significant, application is the condensation of p-phenetidine with acetone to yield 6-ethoxy-2,2,4-trimethyl-1,2-dihydroquinoline which is an unusually effective antiozonant and antioxidant for rubber and an outstanding antioxidant for animal feeds.

Prior art methods for the preparation of p-aminophenyl ethers have involved nitration of mono-substituted benzene derivatives in which the substituent group is —OR or is capable of being converted to —OR by replacement or by alkylation. Thus, a phenyl ether such as anisole or phenetole can be nitrated directly and the p-nitrophenyl ether isolated and reduced to the p-alkoxyaniline (p-aminophenyl ether). Another procedure that has been employed in the preparation of p-aminophenyl ethers has involved the nitration of phenol to p-nitrophenol followed by etherification to form the corresponding p-alkoxynitrophenol and reduction of the nitro group to the —NH₂. Still another procedure has involved nitration of monochlorobenzene followed by etherification to form p-nitroalkoxybenzene and reduction to the corresponding p-aminoalkoxybenzene.

These methods are accompanied in every case by formation of substantial yields of the ortho-nitro isomer in the nitration step with correspondingly lowered yield of the desired p-nitro compound and the corresponding p-alkoxyaniline.

This invention is concerned with the use of p-nitrosophenyl ethers, as starting reactants, in the preparation of p-aminophenyl ethers. The p-nitrosophenyl ethers are advantageously employed in the practice of the invention as starting materials since their preparation involves subjecting phenol to nitrosation which, in contrast to nitration, does not form any appreciable amount of ortho-isomer but yields the para-isomer, i.e., p-nitrosophenol, almost exclusively. Direct reaction of alcohols with p-nitrosophenol as described in the copending application Ser. No. 17,895, filed March 28, 1960, now U.S. patent 3,107,265 referred to hereinafter, readily yields the p-nitrosophenyl ethers. Reduction of these materials yields the desired p-aminophenyl ethers in markedly high yields and, compatible as it is, with the phenol nitrosation route, it offers a much stronger basis for commercial scale operation than that provided by the methods previously used.

This invention thus provides a new and improved route, from phenol which is a readily available and low-cost chemical product, to p-aminophenyl ether yields that are markedly higher than have been obtained heretofore. This route involves a new combination of steps, each of which under mild conditions gives high yields of the specifically desired intermediate, and their combination gives improved yields of the final products.

In accordance with the invention a method for the preparation of p-aminophenyl ethers is provided which comprises reacting a p-nitrosophenyl ether under conditions for converting the nitroso substituent thereof to a corresponding amino substitutent, and recovering a p-aminophenyl ether so produced.

In accordance with one embodiment of the invention, the p-nitrosophenyl ether reactant is subjected to direct catalytic hydrogenation. Mild conditions of temperature and time are utilized to provide high yields of p-aminophenyl ether which, in many instances, are substantially quantitative. Generally, the temperature for the direct hydrogenation is within the range of from about 0 to 160° C., contact time being about 5–600 minutes, or longer, in some instances but preferably in the order of from about 10 to 200 minutes. Any suitable hydrogenation catalyst known in the art can be utilized as, for example, Raney nickel, Raney cobalt, supported catalysts such as nickel-on-kieselguhr, 2–5 percent palladium-on-charcoal, 0.5–2 percent platinum-on-carbon, 2 percent rhodium-on-carbon, and in general any supported noble metal.

In accordance with another embodiment of the invention, the p-nitrosophenyl ether is first condensed in the presence of a basic material to form the corresponding diether of p,p'-dihydroxyazoxy benzene followed by catalytic hydrogenation of the diether so produced to form the corresponding p-aminophenyl ether.

The use of the diether route to p-aminophenyl ethers, in accordance with the invention, offers the very important advantage of utilizing an ether reactant without the need for first isolating it from the reaction mixture in which it is formed, there being no contamination of final product with other materials present in the said reaction mixture. Thus, when a p-nitrosophenyl ether is prepared by the reaction of an alcohol with p-nitrosophenol in the presence of an acid, an equilibrium mixture of the product p-nitrosophenyl ether with unconverted p-nitrosophenol is obtained. Before reduction of the p-nitrosophenyl ether to the p-aminophenyl ether, it must be separated from the unreacted p-nitrosophenol or steps must be taken to force the equilibrium to a high conversion of p-nitrosophenyl ether. In either event there will be residual p-nitrosophenol in the ether-containing mixture. On the other hand, in the practice of the invention, the p-nitrosophenyl ether, in the presence of a basic material, is substantially quantitatively converted to the insoluble diether intermediate which is easily separated and reduced directly to the desired p-aminophenyl ether.

Generally, the temperature for carrying out the condensation of the p-nitrosophenyl ether is within the range of from about 0 to 100° C., preferred reaction time being often in the range of from about 5 to 500 minutes, although in some instances reaction time up to about 24 hours can be advantageously employed. Although the condensation is advantageously carried out at atmospheric pressure, any suitable pressure can be utilized, it being necessary only that the condensation is carried out in liquid phase. Accordingly, depending upon process steps with which the condensation may be associated, it may be convenient to conduct the condensation at subatmospheric pressure or superatmospheric pressure whichever may be, as the circumstances require, the most adaptable to conducting flow of materials from one step to another. Hydrogenation conditions, including catalyst employed, are generally the same as those referred to hereinabove with reference to direct hydrogenation of p-nitrosophenyl ethers. However, the direct hydrogenation is generally carried out with the ether in solution whereas hydrogenation of the diether azoxy compound is more often carried out with the diether suspended as a slurry.

A solvent, or carrier as the case may be, for both the condensation reaction and the direct hydrogenation of the ether is advantageously employed, in which event the solvent (or carrier) is preferably an alcohol which corresponds to the original p-nitrosophenyl ether reactant for purpose of simplified processing, and product purification, e.g., n-butyl alcohol corresponds to p-nitrosophenyl butyl ether. Exemplary of solvents that can be utilized in the condensation and direct hydrogenation steps, in the presence or absence of the alcohol, are hydrocarbons, e.g., toluene, n-heptane, n-hexane; ethers, e.g., diethyl ether, diisopropyl ether, monochlorether; esters, e.g., methyl acetate, butyl acetate; and chlorinated hydrocarbons, e.g., chloroform and carbon tetrachloride. In any event except for the alcohol which functions as a reducing agent to provide increased yield of diether condensation product, the solvent employed is chemically inert in the condensation and direct hydrogenation zones at least to the extent that it is not reactive with the ether reactant to impair yield of desired azoxy compound or p-amino ether products.

Any p-nitrosophenyl ether can be utilized as an ether reactant in the practice of the invention, exemplary of which are p-nitrosophenyl octacosanol ether, ethylene glycol mono-p-nitrosophenyl ether, glycerol mono-p-nitrosophenyl ether, pentaerythritol mono-p-nitrosophenyl ether, hexamethylene glycol mono p-nitrosophenyl ether, p-nitrosophenyl 2-phenylethyl ether, p-nitrosophenyl hexoxybenzyl ether, p-nitrosophenyl n-propyl ether, p-nitrosophenyl i-butyl ether, p-nitrosophenyl n-decyl ether, p-nitrosophenyl lauryl ether, p-nitrosophenyl stearyl ether, p-nitrosophenyl ceryl ether, p-nitrosophenyl cinnamic ether, p-nitrosophenyl tetrahydrofurfuryl ether, p-nitrosophenyl furfuryl ether, p-nitrosophenyl p-octylbenzyl ether, p-nitrosophenyl p-methylbenzyl ether, p-nitrosophenyl p-chlorobenzyl ether, p-nitrosophenyl propargyl ether, p-nitrosophenyl isopropylpropargyl ether, p-nitrosophenyl 2-phenyl ethyl ether, p-nitrosophenyl methyl ether, p-nitrosophenyl cetyl ether, p-nitrosophenyl benzyl ether, p-nitrosophenyl allyl ether, p-nitrosophenyl oleyl ether, p-nitrosophenyl isopropyl ether, p-nitrosophenyl isoamyl ether, p-nitrosophenyl 2-octyl ether, and p-nitrosophenyl cyclohexyl ether.

Preferred ether reactants are those characterized by the structural formula

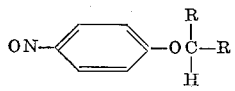

wherein each R is selected from the group consisting of hydrogen, alkyl, alkenyl, alkinyl, phenyl, alkylphenyl, phenylalkyl, alkoxyphenyl, phenylalkenyl, alkoxy alkyl, hydroxy alkyl, cycloaliphatic, halophenyl, nitrophenyl, furan and tetrahydrofuran, but the above said

containing no more than 30 carbon atoms, the said ether thereby containing no more than 36 carbon atoms.

The invention is illustrated with reference to the following examples.

*Example 1*

Twenty grams of p-nitrosophenetole, prepared by the etherification of p-nitrosophenol employing ethanol as the etherification reactant, in accordance with the process of the above referred to U.S. 3,107,265 described in detail elsewhere in this specification was dissolved in 180 ml. of absolute ethanol. To this solution was added 5 percent palladium-on-carbon catalyst, and the resulting admixture was contacted with hydrogen at 25° C. and under a pressure of 60 p.s.i.g. After 3 hours hydrogen was no longer absorbed and the catalyst was removed by filtration. Analysis by ultraviolet spectroscopy showed that the p-nitrosophenetole had been reduced to p-phenetidine in substantially quantitative yield.

*Example 2*

A solution of 3.69 grams of p-nitrosophenol and 0.4 ml. of 3 M sulfuric acid in 50 ml. of ethanol was stirred under nitrogen at about 25° C. for two hours. During this period, etherification took place to provide p-nitrosophenyl ethyl ether in a conversion of about 50 percent. Twenty-five ml. of aqueous sodium hydroxide, 1.5 M was added to the resulting reaction mixture still maintained at the 25° C. level. Under these conditions, the acid in the reaction mixture was neutralized and condensation of the p-nitrosophenyl ethyl ether purification product took place to form p,p'-diethoxyazoxybenzene which precipitated from the reaction mixture. After standing for one hour, the precipitated product was washed successively with water and pentane for purpose of removing catalyst salts, nitrosophenol salts and unreacted alcohol. The washed reaction mixture was then filtered to separate the precipitated p,p'-diethoxyazoxybenzene which was then dried and recovered. Both uncorrected (to a cloudy liquid), and clear, melting points of the precipitated product were determined. The uncorrected melting point was 134.5 to 135.5° C., and the clear point was 165.2 to 165.5° C. These values compare closely with those reported for p,p'-diethoxyazoxybenzene.

*Example 3*

One gram of p-nitrosophenyl ethyl ether made in accordance with the process of Example 2 was dissolved in 20 ml. of absolute ethanol, and 1.0 ml. of 50 percent KOH was added to the resulting solution at about 25° C. A rapid exothermic reaction followed with formation of yellow crystals. The resulting reaction mixture was diluted with 100 ml. of water, the crystals separated, dried and weighed, 0.85 gram of crystal product having a melting point (to a cloudy liquid) at 134–136° C. and a clear point at 164–165° C. The yield of crystal product, p,p'-diethoxyazoxybenzene, was 90 percent based on the p-nitrosoethoxybenzene starting reactant.

*Example 4*

A sample of the crystals formed in accordance with procedure of Example 3 was recrystallized from pentane-acetone solution and analyzed for carbon, hydrogen and nitrogen, the results of which are tabulated as follows.

Calculated for $C_{16}H_{18}N_2O_3$, percent: C, 67.2; H, 6.34; N, 9.80. Found, percent: C, 67.3; H, 6.33; N, 10.35.

*Example 5*

A separate portion of the yellow crystals analyzed as set forth in Example 4 was contacted with hydrogen in the presence of a 5 percent palladium-on-carbon as a catalyst at a temperature of 25° C. and at 60 p.s.i., the contact time being about 120 minutes. Hydrogenation product, p-ethoxyaniline (p-phenetidine), was obtained in about quantitative yield, as determined by ultraviolet spectroscopy.

The foregoing examples illustrate (1) direct hydrogenation of the ether reactant to the p-aminophenyl ether, Example 1; (2) reaction of the ether reactant as a component of the etherification reaction mixture in which it is formed, i.e., without need for its separation and recovery from the etherification reaction mixture, Example 2; (3) reaction of the ether reactant, in the condensation, separate from the etherification reaction mixture in which it is formed, Example 3; and (4) analysis, and hydrogenation, of the diether intermediate product (of Example 3) to the corresponding p-aminophenyl ether, Examples 4 and 5.

Any alkaline reacting agent can be employed in the conversion of the p-nitrosophenyl ether to the corresponding diether of p,p′-dihydroxyazoxybenzene, alkali metal hydroxides being advantageously employed inasmuch as they are readily available, and their salts are easily removed from the azoxy product. Organic amines are advantageously employed especially in view of their solubility characteristics. Further exemplary of these base materials are: lithium hydroxide, potassium hydroxide, sodium hydroxide, rubidium hydroxide, cesium hydroxide, calcium hydroxide, barium hydroxide, strontium hydroxide, methylamine, cyclohexylamine, ethylamine, butylamine, dimethylamine, diethylamine, dibutylamine, trimethylamine, triethylamine, tributylamine, N-methylaniline, N,N-diethylaniline and ammonia. The amount of base employed in carrying out the condensation of the p-nitrosophenyl ether to the corresponding diether compound is generally in a mole ratio to the p-nitrosophenyl ether reactant of at least 1:10, the ratio generally employed being within the limits of about 0.1:1 to 1:1. However, lower ratios of base to p-nitrosophenyl ether can be utilized in some instances.

In a preferred embodiment, and as illustrated herein the condensation is associated with method steps for the preparation of p-nitrosophenyl ether reactant particularly as disclosed and claimed in U.S. 3,107,265, above referred to. In that event, the condensation is most advantageously conducted under the temperature and pressure conditions of the preceding etherification, i.e., the alcohol-p-nitrosophenol reaction of the said U.S. 3,107,265.

As disclosed and claimed in the said U.S. 3,107,265, p-nitrosophenol is reacted with a primary or secondary alcohol at from 0 to 150° C. When operating at temperature and time levels outside the above-referred to ranges, etherification generally takes place but is in yield which is generally lower than that economically feasible for commercial operation, due to undesirable side reactions at the higher temperature levels and to unduly low reaction rates at the lower temperatures. Preferably the etherification is carried out at a temperature within the range of from 15 to 70° C. inasmuch as reaction rate under these temperature conditions is high, and side reactions are at a minimum, in many instances substantially none occurring.

Contact time is, of course, dependent upon the temperature employed. Inasmuch as higher temperatures favor increased rate of the etherification reaction and inasmuch as various alcohols, as etherification reactants, are utilized, it is important to correlate the time and temperature conditions within the above ranges to provide optimum yield. However, a contact time of from 2–500 minutes, and often 15–150 minutes is advantageously utilized.

Pressure conditions for the etherification of the said copending application are not critical except that sufficient pressure is necessary for retaining the reactants in liquid phase. Thus, pressures at least equal to the vapor pressure of the system are employed, atmospheric pressure being most generally employed. It is advantageous in various embodiments to carry out the etherification under subatmospheric pressure in order to more economically associate the etherification step with adjacent steps conducted at subatmospheric pressure levels.

Any acid can be utilized as catalyst in carrying out the etherification of the said copending application Ser. No. 17,895, although stronger acids are preferred because they provide for higher reaction rate. Unless an acid catalyst is employed, no reaction occurs, the rate of reaction being dependent upon the amount of catalyst in the system, i.e. higher reaction rates are obtained with increasing amount of catalyst. The mole ratio of acid catalyst to p-nitrosophenol introduced into the etherification reaction is preferably not greater than about 1:1 and generally within the range of about 0.005:1 to 0.2:1. At a catalyst content above the said 1:1 mole ratio, undesirable side reactions often occur with concomitantly lowered yield of ether product. Usually with a given catalyst there is an optimum concentration which depends on the temperature and the particular ether being formed. For example, when employing sulfuric acid as a catalyst, a concentration of about 2 mole percent (based on the p-nitrosophenol reactant) is advantageously utilized. Exemplary acid catalysts are sulfuric, hydrochloric, phosphoric, p-toluenesulfonic, hydrobromic, hydroiodic, iodic, perchloric, periodic, nitric, benzenesulfonic, methanesulfuric, orthophosphoric, pyrophosphoric, mono-, di-, and tri-, chloroacetic and maleic acids; phosphorus pentachloride, titanium tetrachloride, aluminum chloride, boron trifluoride, ferric chloride, acid clays, e.g., silica-alumina, super filtrol, and acid ion exchange resins such as a polymerized sulfonated vinyl benzene, and the like. Solid acid catalysts are particularly advantageously employed in the practice of the invention as beds, e.g., columnar or layered, in fixed catalyst bed type operation.

Although any acid catalyst can be employed in the process of the above said patent, ether product yields are often somewhat lower when carboxylic acid catalysts are employed due to a tendency of the carboxylic acids to enter into undesirable side reactions in the etherification reaction mixture. Also some high oxygen acids such as nitric acid, perchloric acid, periodic acid and the like are less desirable among the inorganic acid catalysts due to the oxidizing tendencies of these acids, in the etherification reaction mixture, with accompanying lowering of ether product yield.

Although any primary or secondary alcohol reactant can be utilized in the practice of the etherification of carrying out the above said etherification, preferred alcohol reactants are those characterized by the structural formula

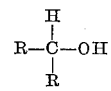

wherein each R is a radical selected from the group consisting of hydrogen, alkyl, alkenyl, alkinyl, phenyl, alkylphenyl, phenylalkyl, alkoxyphenyl, phenylalkenyl, alkoxy alkyl, hydroxy alkyl, cycloaliphatic, halophenyl, nitrophenyl, furan and tetrahydrofuran, but the said alcohol containing not more than 30 carbon atoms.

Figure 1B:
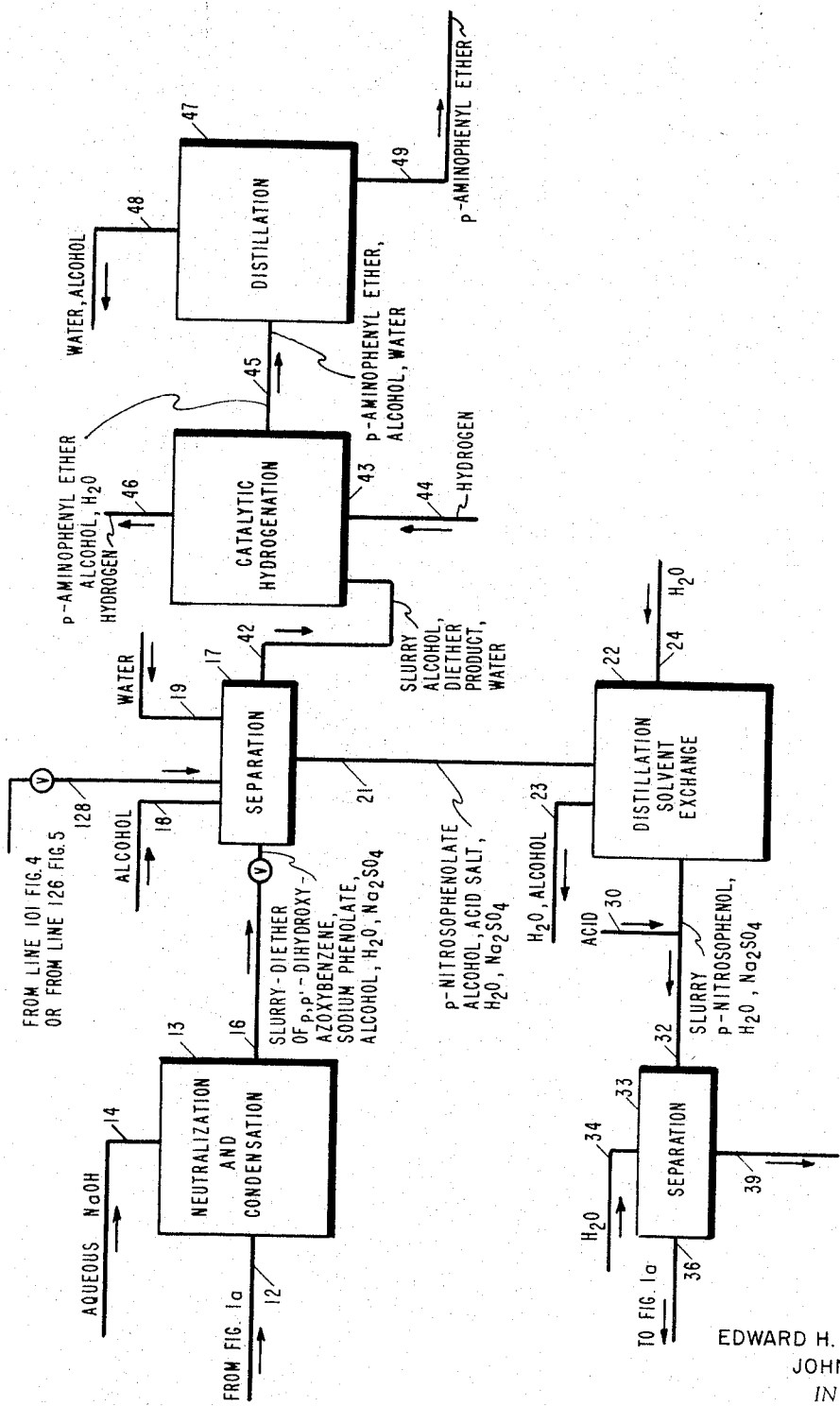
Figure 2:
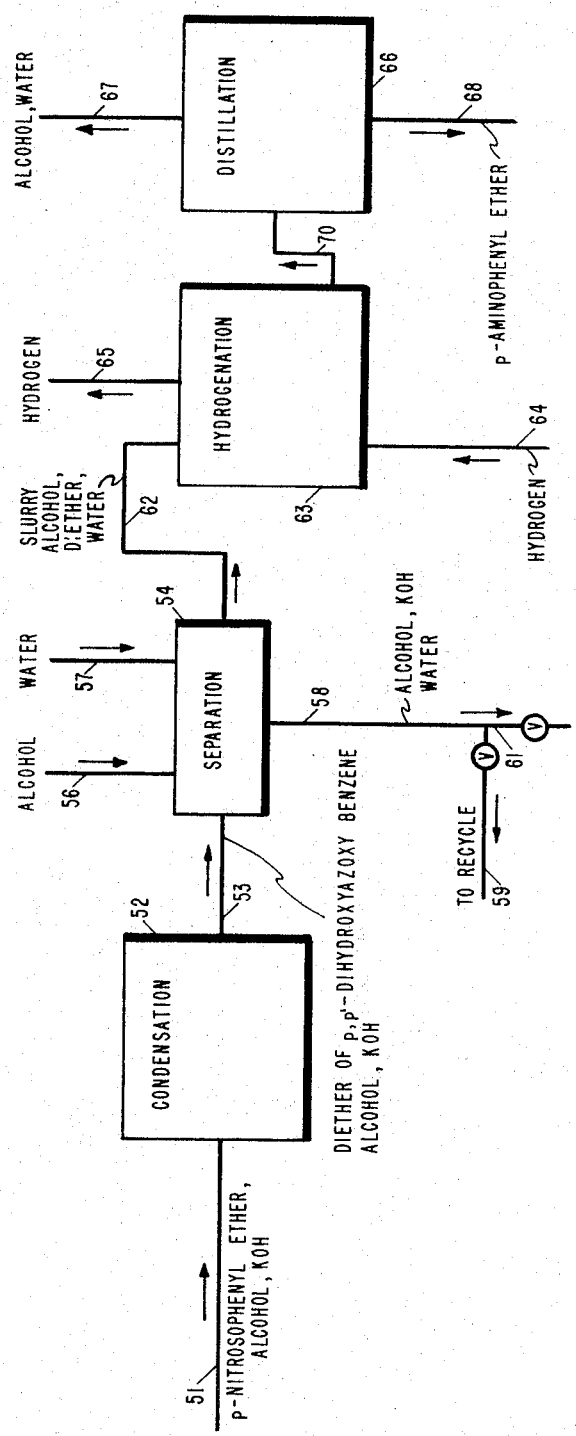
Figure 3:
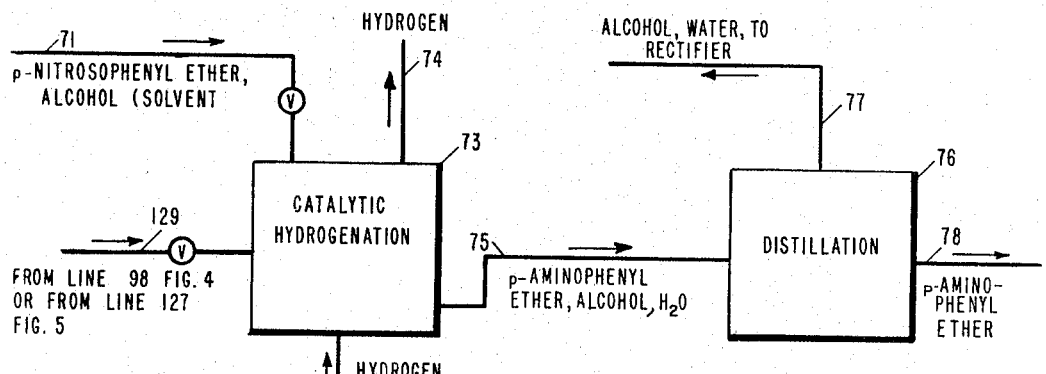
Figure 4:
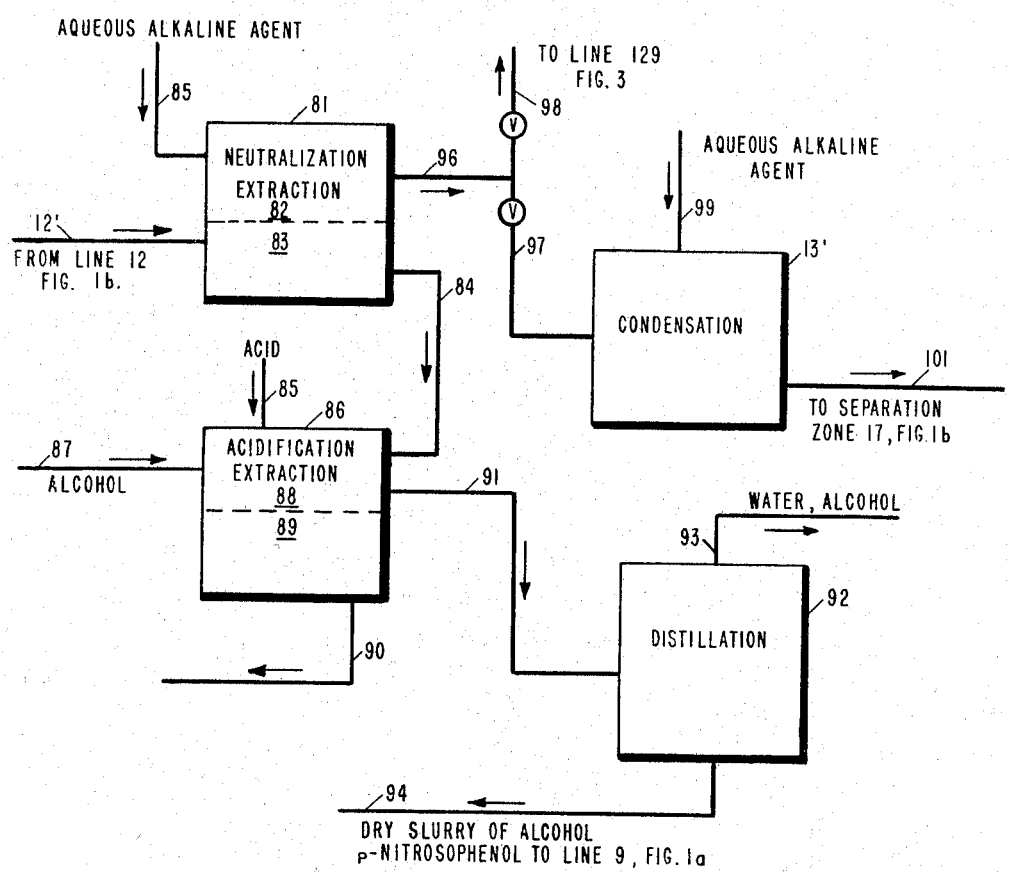
Figure 5:
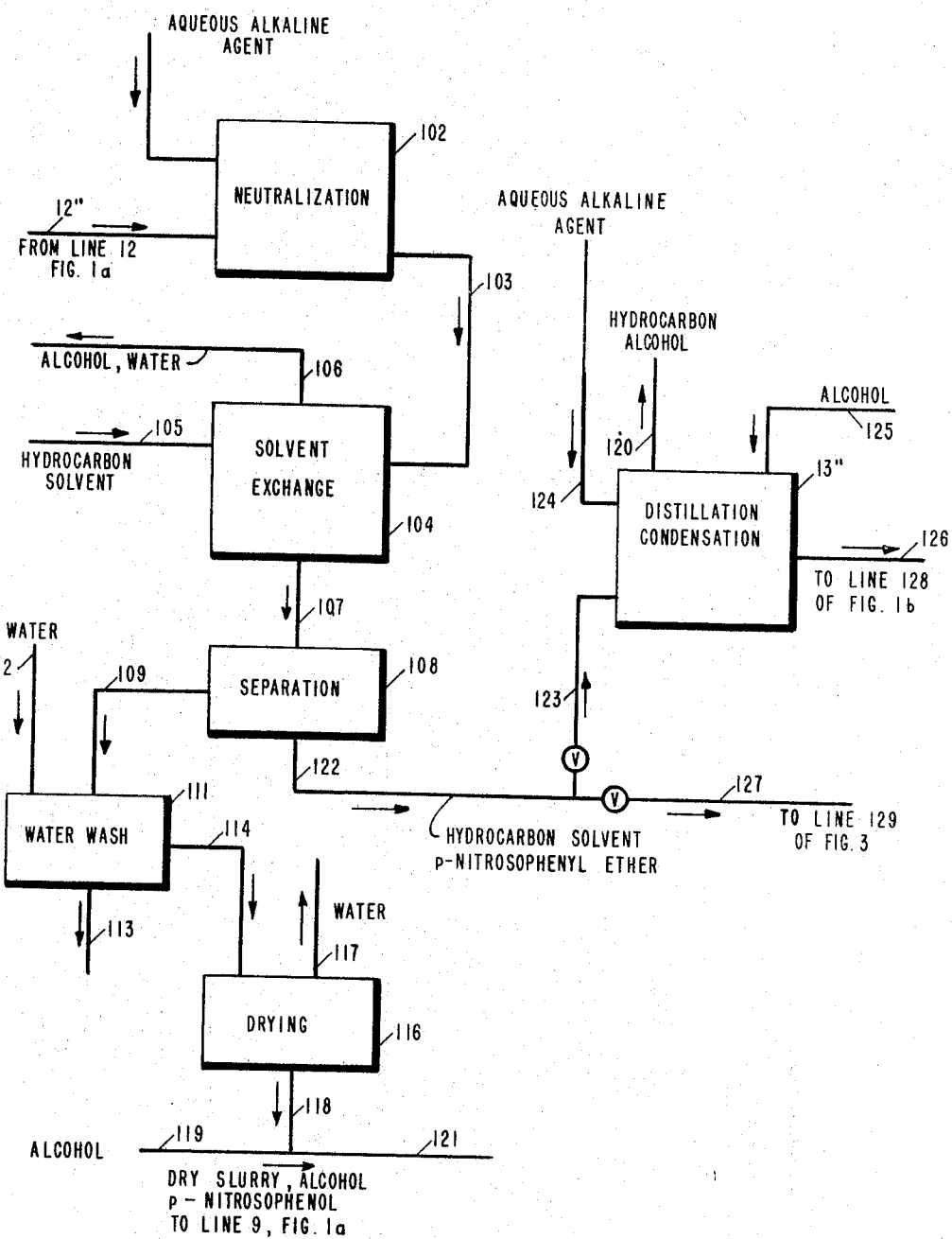

The invention is further illustrated with reference to the drawings of which FIGURES 1a and 1b illustrate the above described condensation and subsequent hydrogenation steps carried out in combination with the above described etherification as the source of the ether reactant, and including phenol nitrosation, when desired in the preparation of p-nitrosophenol as the etherification reactant; FIGURE 2 is illustrative of the above said condensation-hydrogenation steps employing a p-nitrosophenyl ether reactant from any source; FIGURE 3 is illustrative of the above said direct hydrogenation of p-nitrosophenyl ether to form the corresponding p-amino ether; and FIGURES 4 and 5 are each illustrative of a combined etherification-condensation process of the kind above described wherein unreacted p-nitrosophenol in the etherification effluent is removed therefrom to provide a p-nitrosophenyl ether solution for feeding to the condensation-hydrogenation or direct hydrogenation steps. FIGURES 4 and 5 are, respectively, illustrative of separation steps employed when the particular etherification alcohol reactant is water immiscible and when it is water miscible.

With reference to FIGURES 1a and 1b, p-nitrosophenol, a primary or secondary alcohol and an acid are introduced as a dry slurry into etherification zone 11 from line 9 via line 10. Although, as illustrated, p-nitrosophenol from any source can be utilized in the practice of the invention, the invention is most advantageously applied to phenol as a basic starting material through the nitrosation route due to its ready availability and its reactivity to nitrosate and form p-nitrosophenol in high yield. When p-nitrosophenol reactant is formed from phenol via other routes such as phenol nitration, various side reactions occur with concomitantly large proportions of ortho-nitro isomer formation and consequent low yield of p-aminophenyl ether product, based on the starting material.

Thus, in a now preferred embodiment, phenol is nitrosated in nitrosation zone 1 by reaction with nitrous acid formed by in situ reaction in zone 1 of suitable nitrite and acid reactants well known in the art. Generally, an alkali metal nitrite, preferably sodium nitrite, is reacted with an inorganic mineral acid, preferably sulfuric acid, for that purpose. In accordance with one procedure, illustrated with specific reference to the now preferred sodium nitrite and acid reactants, separate streams comprising water, molten phenol, aqueous sodium nitrite, aqueous sodium hydroxide and aqueous sulfuric acid are introduced into zone 1 via lines 2a, 2b, 2c, 2d and 2e, respectively. Exemplary of total charge to nitrosation zone 1 is, on a weight basis, water, 87 percent; phenol, 5 percent; sodium hydroxide, 0.6 percent; sodium nitrite, 4 percent; and sulfuric acid, 3 percent. The optimum proportions in zone 1 are largely dictated by the choice of reactants employed. However, it is generally preferred that the nitrosation conditions, all of which are well known in the art, be controlled so as to provide for generation of nitrous acid in amount in the order of about 10 percent stoichiometric excess of the phenol reactant present.

In carrying out the nitrosation in zone 1, the negative heat of solution of sodium nitrite in water can be advantageously utilized by forming aqueous nitrite solution in line 2c just prior to introduction of same into the nitrosation zone, the newly formed aqueous nitrite solution thereby functioning as a coolant to aid in bringing the reaction zone 1 to the desired level which is generally in the order of about 0–30° C. p-Nitrosophenol is formed in zone 1 to the substantial exclusion of the ortho-isomer and precipitates from the reaction mixture.

Total effluent, a slurry, is discharged from zone 1 via line 3 to separation zone 4, the latter comprising any suitable means for separating the solid p-nitrosophenol from the mixture containing same and can be, for example, a filtration, or a centrifugation system. In any event, water-wet p-nitrosophenol is separated in zone 4 and discharged via line 4a to distillation zone 5 in any suitable manner, preferably carried by an alcohol introduced into zone 4 via line 4b, the said alcohol being the same as that to be charged to zone 11 via line 10 as described hereinafter. Generally then p-nitrosophenol is discharged from zone 4 as a slurry in the alcohol etherification reactant for drying in distillation zone 5. The charge to zone 5 from line 4a contains, for example, from about 60–90 weight percent of the alcohol, 10–30 percent by weight p-nitrosophenol and the remainder, water, Residual liquid, i.e., freed from solid p-nitrosophenol, but containing somewhat more than trace quantities of unprecipitated p-nitrosophenol and additionally comprising, any unreacted phenol, water and acid salt, is discharged from separation zone 4 via lines 4c and 4d for use external to the system or via lines 4c and 4e for recycle in part to nitrosation zone 1. The mixture from line 4a is distilled in zone 5 under vacuum to remove water from the slurry as a component of an alcohol-water distillate discharged via line 5a to any suitable rectification means in zone 6 wherein the water and alcohol components are separated, the former discharged via line 6a, and the latter discharged via line 6b into line 4b for return to separation zone 4. Bottoms product from zone 5 comprises a slurry of p-nitrosophenol in alcohol and contains less than about 0.2 weight percent water, zone 5 often being operated at a pressure in the range of from about 20–50 mm./Hg at about 25–60° C. although pressure and temperature conditions outside those ranges can be employed, if desired.

Dry, i.e., substantially water-free, slurry from zone 5 is discharged via line 7 and introduced via line 10 into etherification zone 11 together with acid, such as sulfuric, from line 8 in proportions described hereinafter. However, when employing p-nitrosophenol from a source other than the phenol nitrosation of zone 1, the acid component is more often introduced into the system from line 9 together with the p-nitrosophenol and alcohol reactants as a slurry, as above described.

The alcohol, ethanol, for example, and p-nitrosophenol reactants are fed to zone 11 via line 10 in a mole ratio of alcohol to p-nitrosophenol, in the order of about 1:1 to 100:1, the acid being fed to zone 11 in a mole ratio to p-nitrosophenol generally in the range of from about 0.005:1 to 0.2:1, but not exceeding 1:1. Alcohol reactant for zone 11 required to supplement that in line 7 to provide the desired alcohol:p-nitrosophenol mole ratio is introduced into line 10 via line 7'. The resulting reaction mixture in zone 11 is maintained at a temperature of from about 0 to 150° C., the reaction time generally being about 10 to 200 minutes, although time and temperature conditions outside these ranges can be utilized if desired.

Whether total effluent from zone 11 is single or two phase depends on the water miscibility of the alcohol reactant. In either event, total effluent from zone 11 comprises p-nitrosophenyl ether, unreacted p-nitrosophenol and alcohol reactants, sulfuric acid and water, and is discharged via line 12 to neutralization-condensation zone 13, FIGURE 1b, and contacted therein with aqueous alkaline agent such as an alkali metal hydroxide, preferably sodium hydroxide, added from line 14 in an amount in excess of that required for neutralization of the acid catalyst and of the unreacted p-nitrosophenol to thereby favor condensation of the ether component to the corresponding diether of p,p'-dihydroxyazoxy benzene, the mole ratio of alkaline agent to the ether reactant being not above 1:1 as described hereinabove. Temperature and time conditions in zone 13 are as described hereinabove.

Total effluent from zone 13 is discharged via line 16 to separation zone 17 and comprises a slurry of solid diether of p,p'-dihydroxyazoxy benzene, unreacted p-nitrosophenol (as phenolate) and alcohol reactants with water and acid salt. Separation zone 17 comprises any suitable means for separating the solid diether compound from effluent in line 16 such as a centrifugal separator system or a suitable filtration system, the latter advantageously comprising a plurality of filtration units so that one unit can be operated to collect the precipitated product from line 16 while previously collected product is removed from another such unit. In any event, separation zone 17 also contains means for washing the collected solid material, first with an alcohol from line 18 advantageously the same as that charged to the etherification zone 11 and then with water from line 19 to remove phenolate, acid salt and the like from the collected solids. Residual liquid from zone 17 is discharged via line 21 to solvent exchange system 22 wherein it is subjected to distillation to remove all alcohol with some accompanying water preferably as a single overhead distillate via line 23. In the event that total effluent in line 21 is two phase, i.e., an organic phase and an aqueous phase, the said aqueous phase is advantageously separated from the residual liquid in line 21 prior to introduction of the residual liquid into zone 22. However, that can be dispensed with if desired, and substantially all water from the aqueous phase from line 21 can be distilled in part from zone 22 and in remaining part removed from zone 33, as described hereinafter. In any event, water is generally added to zone 22 via line 24 to replace the alcohol removed via line 23.

The amount of water added via line 24 can, however, be substantially less than the amount of alcohol discharged via line 23 in those instances wherein the proportion of water in liquid from line 21 is sufficient to carry the phenolate in solution.

In lieu of aqueous alkaline agent from line 14, alcoholic potassium hydroxide can be utilized, which is particularly advantageous when a water immiscible alcohol is employed as an etherification reactant in zone 11, to thereby preclude need for handling the separate aqueous phase from line 21. However, it is necessary in any event that sufficient water be in zone 22 to distill overhead with the alcohol via line 23 and to carry the phenolate in solution as described.

By exchange of water for alcohol in zone 22, together with acid from line 30, the phenolate in line 32 is converted to p-nitrosophenol, which is of low solubility in water and is thereby precipitated and passed as a slurry in water to separation zone 33 which comprises separation means the same as in zone 17 and wherein solid p-nitrosophenol is collected and washed with water from line 34, and from which residual liquids are discharged via line 39 including the wash water.

Water-wet p-nitrosophenol separated from effluent in zone 33 is discharged via line 36 to distillation solvent exchange zone 37, FIGURE 1a, for drying the water slurry by discharge of water as distillate via line 38 and replacement of water thus removed by alcohol reactant, i.e., the same alcohol as charged via line 10 to zone 11, from line 39. A resulting dry slurry of p-nitrosophenol in alcohol is discharged from zone 37 via line 41 for recycle via line 10 to zone 11.

An alcohol slurry of the diether of p,p'-dihydroxyazoxy benzene is discharged from separation zone 17 via line 42 to catalytic hydrogenation zone 43 wherein it is contacted concurrently with upwardly flowing hydrogen from line 44 in the presence of a suitable hydrogenation catalyst, such as illustrated and described hereinabove, for the hydrogenation of the diether to the corresponding p-aminophenyl ether, under mild conditions of temperature and pressure, as described hereinabove. Of course, the particular hydrogenation conditions employed are determined by the particular diether compound and specific catalyst employed. Effluent hydrogen is discharged from zone 43 via line 46. Liquid effluent from zone 43 comprises p-aminophenyl ether, alcohol and some water and is discharged via line 45 to distillation zone 47 and distilled therein to produce total distillate comprising water and alcohol discharged to further rectification via line 48, and p-aminophenyl ether product via line 49 for storage or utilization.

The embodiment of FIGURE 1a–b is particularly advantageous inasmuch as, even though the etherification reaction equilibrium permits only a maximum conversion of about 50–55 percent p-nitrosophenol to the ether, and thereby ordinarily requires a series of ether product recovery steps, the condensation route of this embodiment provides for substantially quantitative conversion of the ether product to the corresponding diether which is insoluble in the condensation reaction mixture and precipitates for easy recovery for hydrogenation to the p-aminophenyl ether product, thus eliminating the need for separate recovery of the ether product of etherification, and further, providing for, in effect, recovery of p-nitroso ether in high purity and, of course, for diether product of high purity.

With reference to FIGURE 2, p-nitrosophenyl ether and a suitable solvent therefor, as described hereinabove, is introduced, preferably as a slurry, together with an alkaline agent preferably as an admixture of the said ether in an alcoholic base, such as potassium hydroxide, via line 51 to condensation zone 52, the latter maintained under conditions described hereinabove with reference to zone 13 of FIGURE 1b, the relative molar properties of p-nitrosophenyl ether, alcohol and alkaline agent being the same as those defined with reference to zone 13 above except that the amount of alkaline agent is only that necessary for the condensation. The alcohol introduced into zone 52 with potassium hydroxide corresponds to the ether reactant, e.g., if p-nitrosophenyl n-butyl ether reactant is charged to zone 52, the alcohol solvent added is n-butyl alcohol.

Total effluent from condensation zone 52 is discharged via line 53 to separation zone 54 and comprises solid diether of p,p'-dihydroxyazoxy benzene, alcohol and potassium hydroxide. Separation zone 54 comprises means the same as that described hereinabove with reference to separation zone 17 of FIGURE 1b. Solid diether product is alcohol washed in zone 54 with an alcohol from line 56, preferably the same alcohol as that in line 51, and is then water washed with water from line 57. Residual liquid from zone 54 is discharged via line 58 to further rectification and recycle via line 59 or other utilization via line 61 as described.

Water-wet and alcohol-wet solid diether product containing supplemental alcohol from line 56 is discharged from zone 54 via line 62 to hydrogenation zone 63, as a slurry, wherein it is contacted countercurrently with upwardly flowing hydrogen from line 64 under temperature and catalyst conditions described with reference to zone 43, total gaseous effluent, being discharged via line 65 and total liquid effluent being discharged via line 70 to distillation zone 66 and therein distilled in the same manner as described hereinabove with reference to zone 47 to provide total alcohol and water distillate discharged via line 67 and dry p-aminophenyl ether product as distillation bottoms discharged via line 68.

With reference to FIGURE 3, a p-nitrosophenyl ether together with a suitable solvent, above described, is passed as a solution via line 71 into catalytic hydrogenation zone 73 and contacted therein in presence of a suitable hydrogenation catalyst in countercurrent flow relation with upwardly flowing hydrogen under conditions for effecting hydrogenation of the nitroso substituent of the p-nitrosophenyl ether reactant to the corresponding —NH$_2$. The hydrogenation in zone 73 is generally carried out under the temperature and time conditions, therefor, described hereinabove. However, the most suitable time and temperature conditions in any given case will depend upon the particular reactant and catalyst utilized. Hydrogenation in zone 73 is substantially quantitative, total gaseous effluent being discharged via line 74 and total liquid effluent being discharged via line 75 to zone 76 and comprising p-aminophenyl ether, alcohol and some water. Zone 76 is maintained under distillation conditions for removal of alcohol and water as distillate via line 77 and withdrawal of p-aminophenyl ether product via line 78.

Alternative to the condensation and direct hydrogenation embodiments illustrated hereinabove, effluent from etherification zone 11 in line 12, FIGURE 1b, can be processed to remove unreacted p-nitrosophenol among other components prior to reaction of the ether to provide an ether solution for feeding to the condensation or direct hydrogenation steps. Thus, as illustrated with reference to FIGURE 4, total effluent from etherification employing a water immiscible etherification alcohol reactant such as n-butanol in zone 11 and discharged via line 12, FIGURE 1b, to line 12', is passed via line 12' into neutralization zone 81 together with aqueous alkaline agent from line 85 which can be the same as that introduced via line 14 into zone 13, FIGURE 1b, for example, an alkali metal hydroxide. The amount of alkaline agent from line 85 is just sufficient to neutralize acid catalyst therein and convert unreacted p-nitrosophenol to the corresponding phenolate whereby separate organic and aqueous phases 82 and 83, respectively, form and separate.

Aqueous phase 83 is discharged from zone 81 via line 84 to acidification zone 86 together with an aqueous acid, e.g., sulfuric acid, from line 85 in amount sufficient to react with and convert the p-nitrosophenolate to p-nitrosophenol which due to its low solubility in water, precipitates, the resulting precipitate dissolving in alcohol reactant from phase 83 and supplemental alcohol the same as that in line 84 introduced via line 87 to form organic phase 88. Organic phase 88 is discharged from zone 86 via line 91 to distillation zone 92 and therein distilled to remove all water via line 93, with some alcohol as a single distillate to provide residual dry alcohol-p-nitrosophenol for discharge via lines 94 and 9 of FIGURE 1a, to etherification zone 11.

Aqueous phase 89 is discharged from line 90 for discard from the process or for distillation to recover unreacted alcohol for reuse in the system, e.g., for recycle to the etherification.

Organic phase 82 from zone 81 comprises p-nitrosophenyl ether dissolved in alcohol reactant from zone 11 and is discharged to condensation zone 13' via lines 96 and 97. Zone 13' is operated under conditions the same as those of zone 13 of FIGURE 1b except that only sufficient alkaline reacting agent from line 99 is introduced into zone 13' for the condensation. Formation of the diether of p,p'-dihydroxyazoxy benzene takes place in zone 13'. Total effluent from zone 13' is discharged via line 101 to separation zone 17, FIGURE 1b and processed from that point as illustrated with reference to FIGURE 1b. Alternatively, organic phase 82 can be discharged via lines 96 and 98 to catalytic hydrogenation zone 73, FIGURE 3 and further processed as illustrated with reference to FIGURE 3.

With reference to FIGURE 5, total effluent from etherification employing a water miscible alcohol reactant, e.g., ethanol, in zone 11, FIGURE 1a, and discharged via line 12 of FIGURE 1a to line 12'', is passed into neutralization zone 102 together with aqueous alkaline agent the same as that introduced into zone 81 from line 85, FIGURE 4 in a sufficient amount to only neutralize acid catalyst in the said effluent. Total effluent, generally single phase but sometimes containing precipitated catalyst salt, is discharged from zone 102 via line 103 to solvent exchange zone 104 and distilled therein to remove alcohol and water as distillate via line 106 with replacement of the alcohol thus removed with solvent in which p-nitrosophenol and water are of low solubility but which exhibits solvent action for the ether product from line 103, e.g., a hydrocarbon solvent such as toluene, n-heptane.

Effluent from zone 104 comprising unreacted p-nitrosophenol precipitated in zone 104 and p-nitrosophenyl ether product dissolved in the solvent exchanged for the alcohol, e.g., n-heptane from line 105, is discharged via line 107 to separation zone 108 such as a filtration or centrifugation system from which solid p-nitrosophenol collected therein is discharged via line 109 to water-wash zone 111 and therein washed with water from line 112 with discharge of washings via line 113. Water-wet slurry discharged from zone 111 via line 114 to drying zone 116 from which water with some alcohol is removed as distillate via line 117 and a resulting dry slurry of p-nitrosophenol in alcohol is discharged via line 118, and together with supplemental alcohol from line 119, the same as that charged as reactant to zone 11, is passed via line 121 to etherification zone 11 of FIGURE 1a, via line 9.

Ether product solution from zone 108 is discharged via lines 122 and 123 to condensation zone 13'' together with aqueous alkaline reacting agent from line 124, the same as that introduced into zone 13' from line 99 and in the same amount. Effluent from zone 13'' is discharged via line 126, and line 128 of FIGURE 1b, to separation zone 17 and further processed as described with reference to FIGURE 1b, making suitable modification for handling of the hydrocarbon solvent, as desired. Alternatively, the ether product solution from line 122 can be passed via line 127 to zone 73 of FIGURE 3 for direct hydrogenation of the ether to the p-aminophenyl ether as illustrated therein.

In the preferred practice of the invention, an alcohol corresponding to the ether is present together with the base during the condensation under which conditions reduction of the ether takes place to yield product substantially free from p-nitrophenyl ether, the latter being formed in significant yield when the ether reactant is reacted in presence of the base, alone or in an inert solvent.

Thus, again with reference to FIGURE 5, in order to facilitate substantially quantitative yield of diether product of condensation in zone 13'', it is necessary that the condensation therein be conducted in a reducing atmosphere. Accordingly, alcohol is added to zone 13'' from line 125 and hydrocarbon solvent is distilled therefrom either prior to addition of alcohol from line 125, or together with some alcohol therefrom, as a single distillate, to remove at least a substantial portion of the hydrocarbon from zone 13'', the amount of alcohol added via line 125 being sufficient to replace at least a substantial portion of the hydrocarbon removed, preferably the entire portion. Alkaline agent is then added to zone 13'' from line 124 for carrying out the condensation, and further processing as illustrated. Alkaline agent can be added concurrently with addition of alcohol from line 125, if the alcohol addition is preceded by the removal of hydrocarbon from zone 13''.

The following examples are further illustrative of the invention as applied to the manufacture of p-aminophenyl ethers utilizing phenol as a starting reactant.

*Example 6*

To a reaction flask are added, with stirring, 94 grams (1 mole) of phenol, 12 grams (0.3 mole) of sodium hydroxide, 14 grams (0.1 mole) of anhydrous sodium sulfate and 1600 ml. of water. When the system is homogeneous, there is added 77 grams (1.1 mole) of sodium nitrite dissolved in 200 ml. of water. The mixture is cooled with an ice bath to approximately 4° C., and 150 ml. of 5 molar $H_2SO_4$ is then added over a period of 2.5 to 3.0 hours. When all the acid has been added, the ice bath is removed and the system warmed to 20° C. Approximately one hour later, the product p-nitrosophenol is filtered off and washed free of acid. The yield of p-nitrosophenol is about 90 percent and the product is substantially of about 95 percent purity.

The wet p-nitrosophenol (0.7 mole, 86 grams) and 500 ml. of n-butanol are charged to a conventional vacuum distillation apparatus. By distillation, the water is removed to provide a slurry of p-nitrosophenol in n-butanol, the pressure being adjusted so the temperature does not rise above 45° C. The volume of this mixture is adjusted to approximately 400 ml. with dry butanol, and 2 ml. (0.036 mole) of concentrated sulfuric acid catalyst is added. This system is stirred under $N_2$ at 35° C. for 2 hours during which time about 45 percent (0.3 mole) of the p-nitrosophenol is converted to p-nitrosophenyl butyl ether. The yield is greater than 95 percent. At the end of the equilibration period, 0.45 mole of sodium hydroxide in 200 ml. of $H_2O$ is admixed with the etherification mixture. Catalyst salt and sodium p-nitrosophenolate move into the water layer, the ether remains in the butanol layer. The p-nitrosophenol can be recovered for recycle by separating the layers, acidifying, and extracting into the alcohol solvent.

After the layers are separated, 12 grams (0.3 mole) of NaOH dissolved in 25 ml. of $H_2O$ is added to the ether solution. An exothermic reaction takes place and yellow crystals of nearly pure p,p'-di-n-butoxyazoxybenzene separate. After a 2-hour period, the crystals are filtered and washed. After washing, they are slurried in n-butanol and hydrogenated to constant pressure using a 5 percent palladium-on-carbon catalyst. After separation of the catalyst, butanol and water are distilled overhead leaving p-aminophenyl butyl ether as pot residue. The yield of product is 40 grams (0.24 mole). The yield, based on p-nitrosophenol, is 80 percent.

Example 7

To a reaction flask are added, with stirring, 94 grams (1 mole) of phenol, 12 grams (0.3 mole) of sodium hydroxide, 14 grams (0.1 mole) of anhydrous sodium sulfate and 1600 ml. of water. When the system is homogeneous, there is added 77 grams (1.1 mole) of sodium nitrite dissolved in 200 ml. of water. The mixture is cooled with an ice bath to approximately 4° C., and 150 ml. of 5 molar $H_2SO_4$ is added over a period of 2.5 to 3.0 hours. When all the acid has been added, the ice bath is removed and the system warmed to 20° C. Approximately one hour later, the product p-nitrosophenol is filtered off and washed free of acid. The yield of p-nitrosophenol is about 90 percent and the purity is about 95 percent.

The wet p-nitrosophenol (0.7 mole, 86 grams) is slurried in 350 ml. of toluene and transferred to a conventional vacuum distillation apparatus. By distillation the water is removed to provide a mixture of dry p-nitrosophenol and toluene, the temperature being controlled so as not to rise above 45° C. When the system is dry, the volume of toluene is adjusted to 100 ml. Two hundred fifty ml. of dry methanol and 2 ml. (0.036 mole) of concentrated sulfuric acid are added, and the mix is stirred under nitrogen for 1 hour at 45° C. During this period, approximately 50 percent of the p-nitrosophenol is converted to p-nitrosoanisole with a yield of better than 95 percent. After the reaction, the acid catalyst is neutralized with 20 ml. of 2 molar sodium hydroxide, and 350 ml. of toluene are added.

Methanol and water are then vacuum distilled from the neutralized mix, each as the toluene azeotrope. After distillation, the solvent is essentially toluene. Because of its low solubility in toluene the p-nitrosophenol precipitates. The precipitated p-nitrosophenol is removed by filtration for recycle and the filtrate, containing 0.35 mole of p-nitrosoanisole, is concentrated by vacuum distillation to 100 ml., and 150 ml. of methanol and 10 grams of NaOH in 50 ml. of $H_2O$ are added. An exothermic reaction ensues, and the p-nitrosoanisole is reduced to azoxyanisole. After stirring for 2 hours, the nearly pure azoxyanisole is filtered off and washed. The washed crystals are slurried in methanol and hydrogenated to constant pressure using a 5 percent palladium-on-carbon catalyst. When reduction is complete, the catalyst is filtered off, and the methanol and water are distilled overhead leaving p-anisidine as pot residue. The yield of product is 37 grams (0.3 mole), and based on p-nitrosophenol, is 85 percent.

Although we have defined a preferred group of primary and secondary alcohol reactants to be utilized in the above described etherification, any primary or secondary alcohol can be utilized, exemplary of which are n-propyl alcohol, i-butyl alcohol, n-decyl alcohol, lauryl alcohol, tridecyl alcohol, stearyl alcohol, n-octacosanol, ceryl alcohol, cinnamic alcohol, tetrahydrofurfuryl alcohol, furfuryl alcohol, ethylene glycol, glycerol, pentaerythritol, p-octylbenzyl alcohol, p-methylbenzyl alcohol, p-chlorobenzyl alcohol, propargyl alcohol, isopropylpropargyl alcohol, 2-phenyl ethanol, p-hexoxybenzyl alcohol, p-methoxybenzyl alcohol, p-nitrobenzyl alcohol, hexamethylene glycol, methanol, ethanol, n-butanol, cetyl alcohol, benzyl alcohol, Cellosolve (monoethyl ether of ethylene glycol), allyl alcohol, oleyl alcohol, isopropyl alcohol, sec. amyl alcohol, 2-octyl alcohol and cyclohexyl alcohol.

As will be evident to those skilled in the art, various modifications can be made or followed, in the light of the foregoing disclosure and discussion, without departing from the spirit or scope of the disclosure or from the scope of the claims.

What we claim and desire to protect by Letters Patent is:

1. A process for the manufacture of a p-aminophenyl ether which comprises admixing an alkaline reacting material with a p-nitrosophenyl ether in amount sufficient to condense said ether to form the corresponding diether of p,p'-dihydroxyazoxybenzene, and hydrogenating the diether so produced to form the corresponding p-aminophenyl ether as product of the process.

2. A process of claim 1 wherein said alkaline reacting material is an alkali metal hydroxide and is admixed with said p-nitrosophenyl ether in a mole ratio thereto within the range of from 0.2:1 to 1:1, and the resulting admixture is maintained at a temperature within the range of from 0–100° C. for a period of from 5–500 minutes; and wherein the said diether is admixed with an alcohol, as a slurry, and the resulting slurry contacted with a hydrogenation catalyst under hydrogenation conditions for converting said diether to the corresponding p-aminophenyl ether.

3. A process of claim 2 wherein said p-nitrosophenyl ether is p-nitrosophenyl n-butyl ether.

4. A process of claim 2 wherein said ether is p-nitrosophenyl ethyl ether.

5. A process of claim 2 wherein said hydrogenation is conducted at a temperature of 0–160° C. for a period of from 10–200 minutes in the presence of a supported hydrogenation catalyst.

6. A process for the manufacture of a p-aminophenyl ether from product of etherification of p-nitrosophenol which comprises reacting p-nitrosophenol with an alcohol selected from the group consisting of primary and secondary alcohols in the presence of an acid and at a temperature within the range of from 0–150° C. to form a p-nitrosophenyl ether; admixing an alkaline reacting material with resulting etherification reaction mixture in amount sufficient to neutralize acid and unreacted p-nitrosophenol components of said mixture and to cause condensation of resulting p-nitrosophenyl ether product therein to form a diether of p,p'-dihydroxyazoxy benzene, whereby said diether product precipitates from the resulting neutralized reaction mixture; separating said diether from the said neutralized reaction mixture and then hydrogenating same to form a corresponding p-aminophenyl ether as product of the process.

7. A process of claim 6 wherein said diether product, separated as described, is admixed with an alcohol the same as the said alcohol reactant of said etherification, and as a resulting alcohol slurry, is contacted with a hydrogenation catalyst under hydrogenation conditions for converting said diether product to said p-aminophenyl ether.

8. In a process of claim 7, distilling alcohol from residual liquid from separation of said diether product and replacing the alcohol thus distilled, at least in part, with water, admixing resulting liquid, substantially alcohol-free, with a sufficient amount of an acid to convert p-nitrosophenolate therein to p-nitrosophenol, drying p-nitrosophenol so produced and then recycling same to said etherification.

9. A process for the manufacture of a p-aminophenyl ether from product of etherification of nitrosophenol which comprises reacting p-nitrosophenol with a water-immiscible alcohol selected from the group consisting of primary and secondary alcohols in the presence of an acid at a temperature within the range of from 0–150° C. to form a p-nitrosophenyl ether; admixing an aqueous alkaline reacting agent with resulting etherification reaction mixture in amount sufficient to neutralize acid and unreacted p-nitrosophenol components therein, whereby the resulting neutralized mixture contains an organic phase and an aqueous phase, the said organic phase comprising said alcohol and p-nitrosophenyl ether and said aqueous phase comprising water, acid salt, p-nitrosophenolate and a portion of said alcohol; acidifying said aqueous phase to convert the said phenolate therein to p-nitrosophenol, and drying p-nitrosophenol and separating p-nitrosophenol from the resulting acidified aqueous phase, and then drying and recycling same to said etherification; admixing said organic phase with a sufficient amount of an alkaline reacting agent to cause condensation of said ether therein to the corresponding diether of p,p'-dihydroxyazoxy benzene, whereby said diether product precipitates; separating diether, so produced, from the reaction mixture containing same, and hydrogenating the thus separated diether product to form a p-aminophenyl ether as product of the process.

10. A process for the manufacture of a p-aminophenyl ether from product of etherification of p-nitrosophenol, which comprises reacting p-nitrosophenol with a water-miscible alcohol selected from the group consisting of primary and secondary alcohols in the presence of an acid at a temperature within the range of from 0–160° C. to form a p-nitrosophenyl ether; admixing an aqueous alkaline reacting agent with the resulting etherification reaction mixture in an amount sufficient to neutralize only the acid therein; distilling alcohol together with water from the resulting neutralized mixture as a single distillate fraction to remove substantially all of said alcohol therefrom, and replacing alcohol, thus removed, with an organic solvent which exhibits solvent action for said ether product but in which water and p-nitrosophenol are of low solubility, whereby p-nitrosophenol precipitates; separating precipitated p-nitrosophenol from the mixture containing same, and drying the thus separated p-nitrosophenol and then recycling same to said etherification; admixing the resulting solution of said ether product in said organic solvent with sufficient alkaline reacting material to condense the p-nitrosophenyl ether component thereof to the corresponding diether of p,p'-dihydroxyazoxy benzene, whereby said diether product precipitates; separating precipitated diether product from the mixture containing same and hydrogenating the thus separated diether to form the corresponding p-aminophenyl ether as product of the process.

11. A process for the manufacture of an aminophenyl ether from phenol as a starting reactant, which comprises forming nitrous acid by in situ reaction of an aqueous nitrite salt and an acid in the presence of phenol to react said nitrous acid with said phenol to form p-nitrosophenol, whereby water-wet p-nitrosophenol precipitates from the resulting nitrosation reaction mixture; separating water-wet precipitated p-nitrosophenol from said nitrosation mixture, and drying same by distillation of water therefrom; reacting resulting dried p-nitrosophenol with an alcohol selected from the group consisting of primary and secondary alcohols in the presence of an acid and at a temperature within the range of from 0–150° C. to form a p-nitrosophenyl ether; admixing an alkaline reacting material with resulting etherification reaction mixture in amount sufficient to neutralize acid and unreacted p-nitrosophenol components of said mixture and to cause condensation of resulting p-nitrosophenyl ether product therein to form a diether of p,p'-dihydroxyazoxy benzene, whereby said diether product precipitates from the resulting neutralized reaction mixture; separating said diether from the said neutralized reaction mixture and then hydrogenating same to form a corresponding p-aminophenyl ether as product of the process.

12. A process for the manufacture of a p-aminophenyl ether from phenol as a starting reactant, which comprises forming nitrous acid by in situ reaction of an aqueous nitrite salt and an acid in the presence of phenol to react said nitrous acid with said phenol to form p-nitrosophenol, whereby water-wet p-nitrosophenol precipitates from the resulting nitrosation reaction mixture; separating water-wet precipitated p-nitrosophenol from said nitrosation mixture, and drying same by distillation of water therefrom; reacting resulting dried p-nitrosophenol with a water-immiscible alcohol selected from the group consisting of primary and secondary alcohols in the presence of an acid at a temperature within the range of from 0–150° C. to form a p-nitrosophenyl ether; admixing an aqueous alkaline reacting agent with resulting etherification reaction mixture in amount sufficient to neutralize acid and unreacted p-nitrosophenol components therein, whereby the resulting neutralized mixture contains an organic phase and an aqueous phase, the said organic phase comprising said alcohol and p-nitrosophenyl ether and said aqueous phase comprising water, acid salt, p-nitrosophenolate and a portion of said alcohol; acidifying said aqueous phase to convert the said phenolate therein to p-nitrosophenol, and drying p-nitrosophenol, and separating p-nitrosophenol from the resulting acidified aqueous phase, and then drying and recyling same to said etherification; admixing said organic phase with a sufficient amount of an alkaline reacting agent to cause condensation of said ether therein to the corresponding diether of p,p'-dihydroxyazoxy benzene, whereby said diether product precipitates; separating diether, so produced, from the reaction mixture containing same, and hydrogenating the thus separated diether product to form a p-aminophenyl ether as product of the process.

13. A process for the manufacture of a p-aminophenyl ether from phenol as a starting reactant, which comprises forming nitrous acid by in situ reaction of an aqueous nitrite salt and an acid in the presence of phenol to react said nitrous acid with said phenol to form p-nitrosophenol, whereby water-wet p-nitrosophenol precipitates from the resulting nitrosation reaction mixture; separating water-wet precipitated p-nitrosophenol from said nitrosation mixture, and drying same by distillation of water therefrom; reacting resulting dried p-nitrosophenol with a water-miscible alcohol selected from the group consisting of primary and secondary alcohols in the presence of an acid at a temperature within the range of from 0–160° C. to form a p-nitrosophenyl ether; admixing an aqueous alkaline reacting agent with the resulting etherification reaction mixture in an amount sufficient to neutralize only the acid therein; distilling alcohol together with water from the resulting neutralized mixture as a single distillate fraction to remove substantially all of said alcohol therefrom, and replacing alcohol, thus removed, with an organic solvent which exhibits solvent action for said ether product but in which water and p-nitrosophenol are of low solubility, whereby p-nitrosophenol precipitates; separating precipitated p-nitrosophenol from the mixture containing same, and drying the thus separated p-nitrosophenol and then recycling same to said etherification; admixing the resulting solution of said ether product in said organic solvent with sufficient alkaline reacting material to condense the p-nitrosophenyl ether component thereof to the corresponding diether of p,p'-dihydroxyazoxy benzene, whereby said diether product precipitates; separating precipitated diether product from the mixture containing same and hydrogenating the thus separated diether to form the corresponding p-aminophenyl ether as product of the process.

No references cited.

CHARLES B. PARKER, *Primary Examiner.*

ROBERT V. HINES, *Assistant Examiner.*